July 24, 1928.
M. BRESLAUER
1,678,460
PHOTOGRAPHIC APPARATUS
Filed July 23, 1923
2 Sheets-Sheet 2
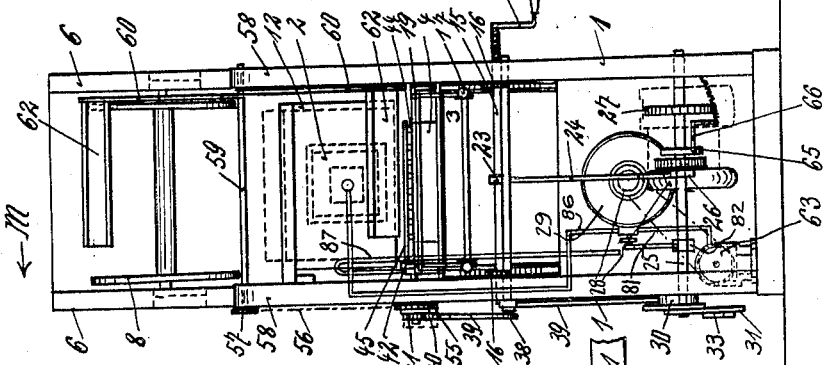
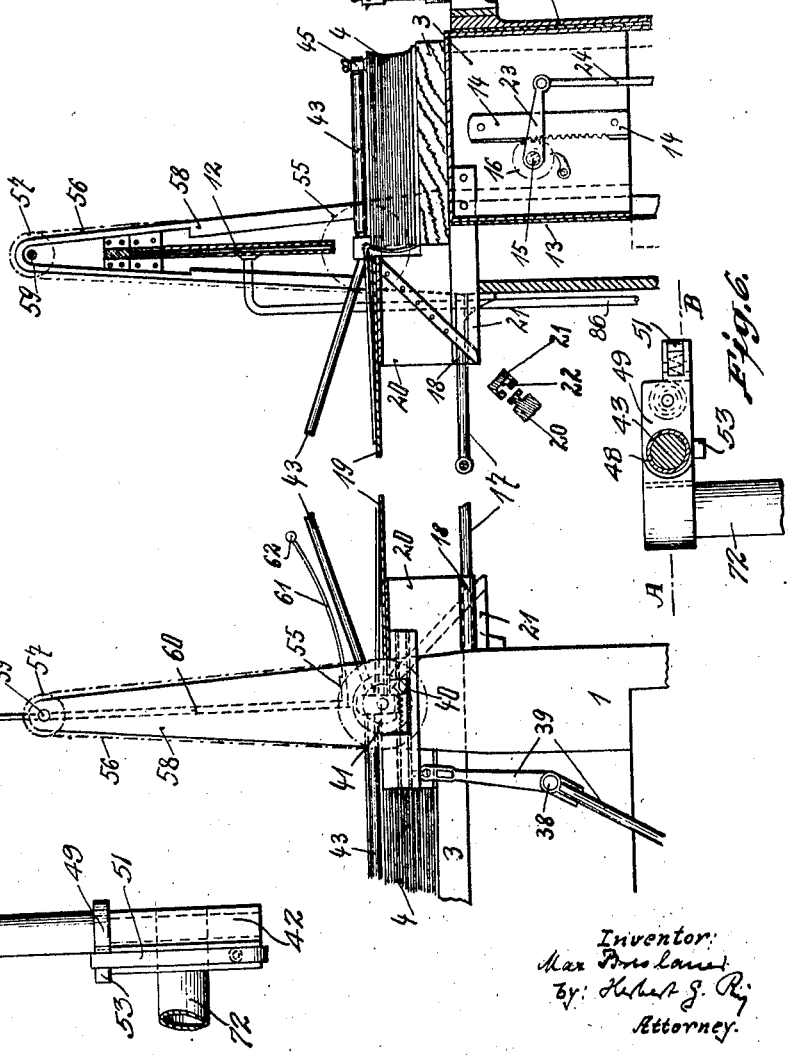
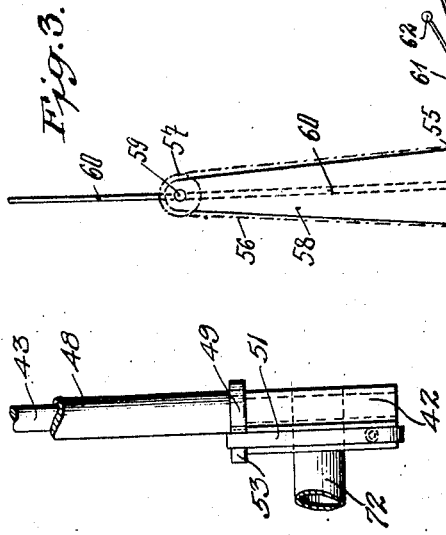
Inventor:
Max Breslauer
By: Herbert J. Ry
Attorney.

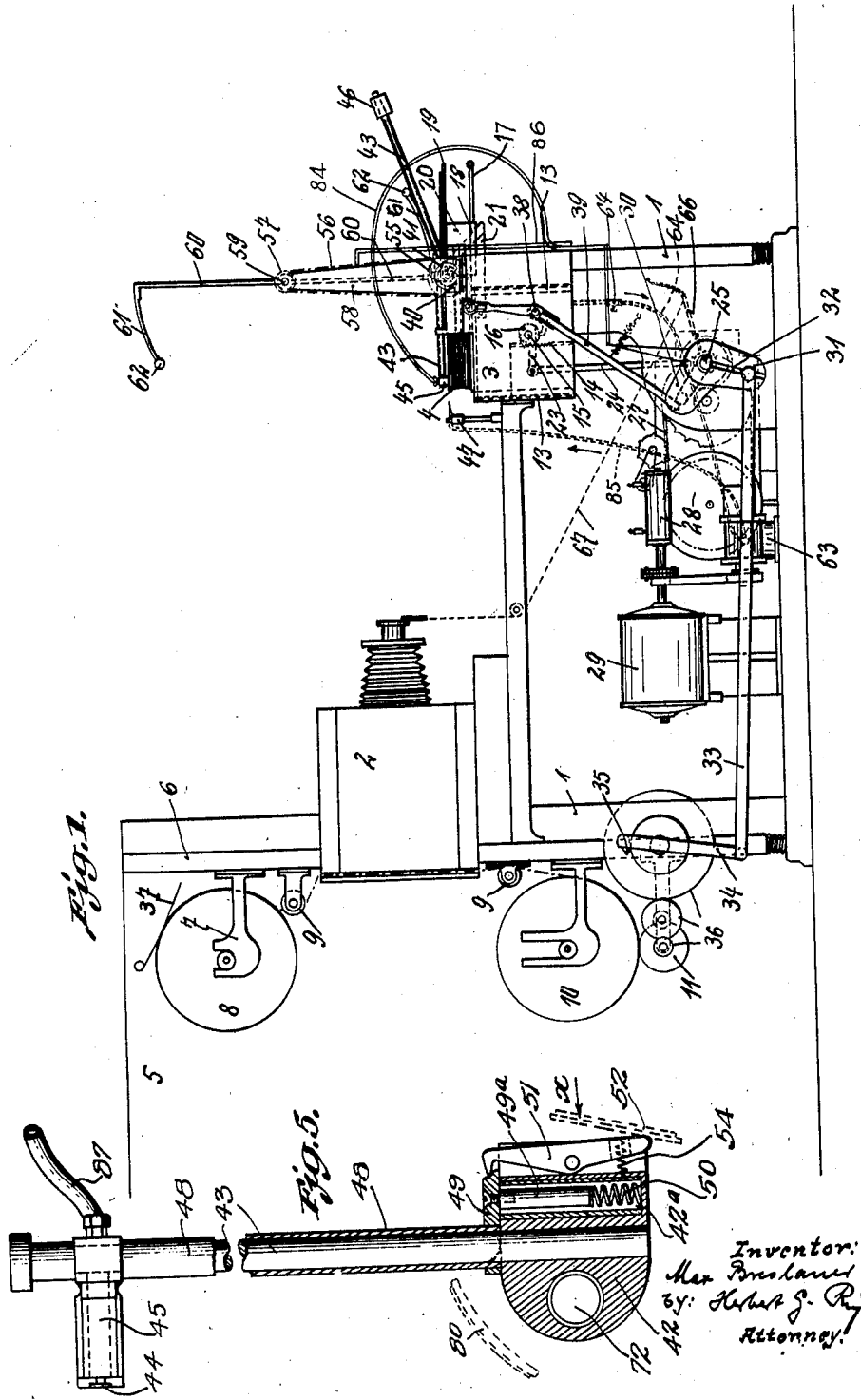

Patented July 24, 1928.

1,678,460

UNITED STATES PATENT OFFICE.

MAX BRESLAUER, OF LEIPZIG, GERMANY.

PHOTOGRAPHIC APPARATUS.

Application filed July 23, 1923, Serial No. 653,348, and in Germany July 17, 1922.

My invention relates to a device for photographing continuously successive sheets of books or the like, drawings, and similar or other papers, etc., and the object of my invention is to obviate certain drawbacks experienced with the known devices devised for the purpose above stated. With the known apparatus the sheet to be photographed must be placed by hand into the position in which the exposure is to be made, and also the shutter of the apparatus must be operated by hand. It is obvious that the output of such devices cannot be large, and producing, for instance, a photographic copy of a whole book requires very much time. The object proper of my invention is to substitute automatic action for the manipulations stated, especially as regards bringing the sheets into the proper position in which they shall be photographed, turning them over, and moving them out of the way after the photographing operation has been finished. The arrangement and combination of parts may be such that the shaft driving the device actuates at the proper time also the shutter, as well as the feed motion for the film band, as is all fully described hereinafter.

My invention is illustrated, by way of example, in the accompanying drawings, in which Figure 1 is a side view of the complete apparatus; Figure 2 is a rear view thereof; Figure 3 shows on an enlarged scale the operating means for turning over the photographed sheets; Figure 4 is a side view of these means seen in the direction of the arrow in Fig. 2; Figure 5 shows the mechanism for lifting the individual leaves of the book in side-view, Figure 6 shows it in plan, and Figure 7 in front-view.

A photographic apparatus 2 is mounted elastically on a frame 1 and may be adjusted in its longitudinal direction. At the other end of the frame is a vertically movable frame 3 on which the book 4 is placed, of which sheets are to be copied. The rear part of the frame with the rear end of the camera are located in a dark room 5. At the end of the frame where the camera is mounted are standards 6 carrying on arms 7 a roll 8 located above the camera and being provided with sensitive paper. There is used either a transparent film or a draw-off film of known kind. The film is conducted over guide rolls 9 past the rear side of the camera and is wound on a roll 10 which is vertically movable in slots and can be rotated at the proper time by means of a friction roll 11 acting on the circumference of its rim.

In order to adjust the sheet from which an exposure is to be made relatively to the camera, in proper position, and to hold it perfectly flat while the exposure is being made, it is placed against the front wall of a chamber 12 which is attached to the frame; said front wall is parallel to that part of the film which moves past the rear part of the camera, and is provided with holes, with the aid of which the sheet may be held fast against it by means of sucked air. The size of the chamber in question must, of course, be such that it is apt to hold fast the largest sheets occurring. According as the thickness of the book decreases, it must be readjusted vertically, as well as horizontally, relatively to the chamber in order to provide that the sheets can get placed smoothly against the front wall mentioned and that the distance between them and the object glass is correct.

The table 3 which supports the book and is guided along ledges 13 is attached to racks 14 which are guided in the frame and mesh with cog-wheels 16 secured to a common shaft 15. At the lifting of another leaf of the book the shaft 15 is rotated and lifts the table 3 by means of the cog-wheels 16 as much as corresponds to the thickness of a leaf.

At the rear wall of the frame rods 17 are provided on which slide sleeves 18 carrying a second table 19 which is horizontally movable and has its front wall situated ordinarily closely over the rear wall of the table 3. At the lower side of the table 19 are ledges 20, of which that edge which is directed towards the table 3 is cut obliquely under an angle of 45°. Similar ledges 21 are attached to the table 3; they extend in the direction of the ledges 20 and are also cut off obliquely like the latter. The oblique edges of the ledges 21 are provided each with a guide groove 22 into which engages the correspondingly profiled edge of one of the ledges 20 whereby the two tables are coupled with each other in such a manner that the table 19 is positively shifted horizontally when the table 3 is shifted in vertical direction. The table 19 serves for the reception of the rearwardly turned part of the book cover and of the sheets or leaves which have already been copied.

The cog-wheels 16 by which the table 3 is lifted is operated by the shaft 15 and by a crank 23 operated by a rod 24 from a cam disk 26 affixed to the shaft 25. This crank is adjustable so that the stroke of the table may be adjusted according to the thickness of the leaf, as already mentioned. The shaft 25 is rotated by a chain drive 27 and by a worm gear 28 from an electromotor 29. On that end of the shaft 25 which projects above the machine frame is provided a cam disk 30 and a crank 31 with a longitudinal groove 32 in which a block may be adjusted. One end of a thrust bar 33 is pivoted to this block and the other end thereof is pivoted to a lever 34 supported at the frame at that end where the camera is located. 35 is a pawl by which the friction roll 11 driving the winding-on roll 10 for the film is actuated when the thrust bar is moved in corresponding direction, the rotary motion being transmitted by intermediate rolls 36, as shown.

By operating this feed mechanism another part of the film is drawn off the roll 8, and that part which has already been exposed is wound on the roll 10. In order to prevent the roll 8 from rotating more than necessary when the film band is suddenly drawn off, a braking spring 37 is provided. The length of the part of the film drawn off by one movement of the lever 34 can be regulated exactly by adjusting the block in the groove 32 of the crank 31.

On the circumference of the cam disk 30 glides a double-armed lever 39 which is fulcrumed at 38 and serves for actuating all mechanisms provided for raising and depositing the individual sheets or leaves of the book. The free end of this lever 39 is pivoted to a rack 40 guided in horizontal guides provided at the frame. This rack meshes with a cog-wheel 41 situated on a pivot 72 supported in the frame, and the inner end of this pivot is firmly connected with a block 42, to which is hinged a bell-crank lever 43 carrying at its front end a tube 45 which serves to lift the sheets or leaves and is provided for this purpose with suction heads 44, whereas its other end is loaded with a counterpoise 46. That arm of the lever which carries the suction pipe 45 extends normally vertically upwards. If, when the lever 39 has been moved by the cam disk 30, the rack 40 is shifted, the rack 41 rotates by 90° whereby the lever 43 is so moved that the suction heads get to lie on the uppermost sheet which now adheres to the heads by reason of the suction current and is lifted when the lever is moved in the other direction. In order to warrant unobjectionable turning of the sheet, the book must so lie on the table 3 that its back coincides approximately with the axis of rotation of the lever 43.

In front of the book is a blowing device 47 which is secured to the frame and blows a blast of air towards the leaves of the book so that when the sucking device will lift the uppermost leaf this separates easily from the leaves below it. As soon as the suction tube 45 arrives in the proximity of the suction chamber 12, the suction current thereof becomes active in consequence whereof the lower part of the leaf held in its upper part by the suction heads 44 of the suction tube 45 is sucked to the front wall of said chamber. The suction tube 45 withdraws in this moment from the leaf in question so that now also its upper part being released is sucked to the suction chamber 12. While this occurs, the suction current in the suction pipe is interrupted in a manner later described so that it can easily get off the leaf. This movement of the suction pipe is effected in a manner as follows:—

On the lever 43 a tube 48 is shoved which carries the suction pipe 45. At the lower end of the tube 48 a plate 49 is affixed which rests ordinarily upon the block 42 and bears on the lower surface a bolt 49ª guided in a hole 42ª of the block 42. This bolt 49¹ prevents turning of the plate 49 and the tube 48 around the lever 43, so that the suction pipe 45 which must always occupy a parallel position to the front wall of the suction chamber 12 and to the book 4 cannot lose this position. The bolt 49ª is subjected to the action of a spring 50 that tends to shift upwards the bolt 49ª, the plate 49 and the tube 48 secured to it. Ordinarily, however, the plate 49 is checked by a pawl 51 pivoted to the block 42 and actuated by a spring 54 so that it rests on the block. When the lever 43 is swung from the horizontal position, in which the suction pipe 45 lies on the uppermost sheet of the book, to the vertical position, the pawl 51 pushes at the end of the movement on an abutment 52 provided at the frame wall whereby it is pressed back and the plate 49 is released. This latter is now being shoved together with the tube 48 along the lever 43 under the pressure exerted by the spring 50 and in consequence whereof the suction pipe withdrawn from the leaf just lifted. If, then, the lever 43 is again lowered from the vertical to the horizontal position in order to take up another leaf, a lug 53 projecting forth from the plate 49, which stands still in some distance from the block 42, slides upon an abutment 80 provided at the frame wall and having the shape of an arco eccentric to pivot point of the lever 43, whereby the plate 49 with the tube 48 is again pressed against the block 42, the spring actuated pawl 51 engaging then the plate 49 and checking it.

The cog-wheel 41 is connected by means of a coupling which acts only in one direction with a chain wheel 55 driving another chain wheel 57 by means of a chain 56, said other chain wheel being supported on a shaft 59 supported in its turn in standards 58 of the frame. To this shaft is attached, opposite to the double-armed lever 43, another double-armed lever 60 carrying at its ends, at curved elastic arms 61, rods 62 directed towards the chamber 12. If the cog-wheel 41 rotates in such a direction that the lever 39 moves towards the book, the shaft 59 and the lever 60 attached thereto are turned 180° by means of the chain. One of the rods 62 contacts then with the leaf which is still held fast at the front wall of the chamber 12 and draws it off in downward direction after the suction current has been interrupted. The drawn-off leaf is placed smoothly on the formerly treated leaves by the rod 62, and re-lifting thereof may be prevented by means of a finger provided at the frame and being held down on the leaves treated and being lifted automatically when another leaf is to be placed on these other ones.

The suction air and the compressed air required for the proper operation of the machine is produced by an air pump 63 driven by the motor 29. The delivery branch of the pump 63 is connected with the blowing mechanism by means of a hose 85, whereas the suction branch is connected by a tube 81 with two tubes 86 and 87, from which the first is connected with the suction chamber 12, the other with the suction pipe 45 effecting the lifting of the leaves. At the place of junction of the three suction pipes 81, 86, and 87 is arranged a two-way cock 64 controlled by a cam disk 82 of the shaft 25 in such a manner that the pump is connected alternately with the suction pipe 45 and the suction chamber 12.

Affixed to the shaft 25 which actuates the leaf turning-over mechanism is, besides the parts already mentioned, also a cam disk 65 operating a lever 66 pivoted to the frame. The free end of this lever which is a bell-crank lever is connected with the objective glass of the camera by a cord 67 which opens the shutter of the camera when the lever 66 is oscillated. The exposing time is adjusted by re-adjusting the cam disc 65.

If the pages of a book are to be photographed, first the table is so much lowered that the uppermost sheet or leaf of the book (after the cover has been opened) is in such a height that the suction pipe 43 just touches that sheet when it has been lowered. In order to render possible the downward movement of the table, a hand crank 68 is affixed to the projecting end of the shaft 15, and the feed gear 23 is uncoupled by the actuation of this crank. The book is so placed on the table that the sewing rim of the uppermost leaf lies in the axis of rotation of the cog-wheel 41. Thereafter the camera is correspondingly adjusted.

When starting the machine, the suction pipe is placed down upon the uppermost leaf, takes hold of it, and places it against the front wall of the chamber 12 at which it is held fast by the sucking action. After the leaf has been thus adjusted, the shutter of the object glass is opened automatically by the lever provided for that purpose, and shortly thereafter the suction pipe 43 is again lowered, and at the same time the lever 60 is so turned that that rod 62 which up to this moment has been retained in its upper position contacts with the lower part of the leaf still held fast at the wall of the chamber 12, withdraws it, and places it in flat state upon the rearwardly turned cover of the book.

While the suction pipe 43 is lowered the table 3 is shifted rearwards only a trifle so that another part of the not yet exposed film arrives in the camera. These phases are repeated until all pages of the book have been photographed. The book is then turned upside down and the other pages are copied in the same manner, viz, those sides which up to then had been in contact with the wall of the chamber 12. After all pages of the book have been copied on the film, this latter is removed from the machine and developed and fixed by means of any of the machines known for these purposes. The film band is then cut into the pieces representing the consecutive pages, or, if the film is a draw-off film, the layer bearing the copies is drawn off and only then cut. The thus obtained negatives are used for the production of the plates employed usually in the offset-machine in which the book is printed.

I claim:

1. An apparatus for the continuous photographing of pages, drawings, and the like, forming parts of a book, comprising, in combination, a photographic camera, a shutter forming part thereof, means for actuating the shutter, a table adapted to receive the book, a suction pipe and suction heads thereat and being adapted to lift the sheets etc to be photographed, means to produce a sucking current in said suction pipe, a blast nozzle located at a side of the book and being adapted to blow air against the upper leaf edges, means to produce the air current for said nozzle, a bell-crank lever to which the said pipe is adjustably attached, a cam disk so arranged as to be adapted to actuate said lever, means to operate said disk, and a suction chamber having a perforated front wall against which the sheet etc. is lifted by the said lever and the said suction pipe, as set forth.

2. An apparatus for the continuous photographing of pages, drawings, and the like, forming parts of a book, comprising, in combination, a photographic camera, a shutter forming part thereof, means for actuating the shutter, a table adapted to receive the book, a suction pipe and suction heads thereat and being adapted to lift the sheets etc. to be photographed, means to produce a sucking current in said suction pipe, a bell-crank lever to which the said pipe is adjustably attached, a pivot bearing said lever, and being supported in the frame of the apparatus, a cog-wheel arranged on an outwardly projecting end of said pivot, a rack meshing with said cog-wheel, a double-armed lever connected with said rack, a cam disk so arranged as to be adapted to oscillate this lever to such an extent that said cog-wheel is rotated for 90° at such oscillation of the double-armed lever, and means to rotate said cam disk, as set forth.

3. An apparatus for the continuous photographing of pages, drawings, and the like, forming parts of a book, comprising, in combination, a photographic camera, a shutter forming part thereof, means for actuating the shutter, a table adapted to receive the book, a suction pipe and suction heads thereat and being adapted to lift the sheets etc. to be photographed, means to produce a sucking current in said suction pipe, a bell-crank lever to which the said pipe is adjustably attached, a pivot bearing said lever, and being supported in the frame of the apparatus, a cog-wheel arranged on an outwardly projecting end of said pivot, a rack meshing with said cog-wheel, a double-armed lever connected with said rack, a cam disk so arranged as to be adapted to oscillate this lever to such an extent that said cog-wheel is rotated for 90° at such oscillation of the double-armed lever, a shaft located above said pivot, another double-armed lever located opposite to said bell-crank lever and having sector-like curved ends, wings at these ends, chain wheels and a chain connecting said cog-wheel and said shaft, a coupling inserted into said chain drive and adapted to couple only in one direction, a suction chamber having a perforated front wall, against which the sheet etc. is lifted by the said lever and the said suction pipe, the upper of said wings being adapted to contact with the lower edge of the leaf located at said perforated wall, as set forth.

4. An apparatus for the continuous photographing of pages, drawings, and the like, forming parts of a book, comprising, in combination, a photographic camera, a shutter forming part thereof, means for actuating the shutter, a table adapted to receive the book, a suction pipe and suction heads thereat and being adapted to lift the sheets etc. to be photographed, means to produce a sucking current in said suction pipe, a bell-crank lever to which the said pipe is adjustably attached, a cam disk so arranged as to be adapted to actuate said lever, a shaft having said cam disk attached to it, an electric motor driving said shaft, a worm gearing inserted between the motor and the said shaft, a crank also secured to the shaft, a thrust bar hinged to the crank, a film band and means to carry and to feed it in the proper succession, and intermediate wheels inserted between said feeding means and said thrust bar, as set forth.

5. An apparatus for the continuous photographing of pages, drawings, and the like, forming parts of a book, comprising, in combination, a photographic camera, a shutter forming part thereof, means for actuating the shutter, a table adapted to receive the book, a suction pipe and suction heads thereat and being adapted to lift the sheets etc. to be photographed, means to produce a sucking current in said suction pipe, a bell-crank lever to which the said pipe is adjustably attached, a cam disk so arranged as to be adapted to actuate said lever, a shaft having said cam disk attached to it, an electric motor driving said shaft, a worm gearing inserted between the motor and the said shaft, a crank also secured to the shaft, a thrust bar hinged to the crank, a film band and means to carry and to feed it in the proper succession, and intermediate wheels inserted between said feeding means and said thrust bar, another cam disk attached to the said shaft, a bell-crank lever actuated by this cam disk, and a cord connecting this lever with the shutter of the photographic camera, as set forth.

6. An apparatus for the continuous photographing of pages, drawings, and the like, forming parts of a book, comprising, in combination, a photographic camera, a shutter forming part thereof, means for actuating the shutter, a table adapted to receive the book, guide rails affixed to the frame of the apparatus and being adapted to guide the table vertically, means to adjust the table along said rails, a suction pipe and suction heads thereat and being adapted to lift the sheets etc. to be photographed, means to produce a sucking current in said suction pipe, a bell-crank lever to which the said pipe is adjustably attached, a cam disk so arranged as to be adapted to actuate said lever, means to operate said disk, and a suction chamber having a perforated front wall against which the sheet etc. is lifted by the said lever and the said suction pipe, as set forth.

7. An apparatus for the continuous photographing of pages, drawings, and the like, forming parts of a book, comprising, in combination, a photographic camera, a shutter forming part thereof, means for actuating the shutter, a table adapted to receive the book, guide rails affixed to the frame of the apparatus and being adapted to guide the table vertically, racks affixed to the table, cog-wheels meshing with said racks, a shaft to which these cog-wheels are affixed, and means to rotate this shaft partially according to the thickness of the leaves of the respective book, substantially as described.

8. An apparatus for the continuous photographing of pages, drawings, and the like, forming parts of a book, comprising, in combination, a photographic camera, a shutter forming part thereof, means for actuating the shutter, a table adapted to receive the book, guide rails affixed to the frame of the apparatus and being adapted to guide the table vertically, racks affixed to the table, cog-wheels meshing with said racks, a shaft to which these cog-wheels are affixed, an intermittently operating feed motion for this shaft, a coupling connected with this feed motion, a hand crank adapted to be shoved upon the latter shaft and to disengage said coupling when being shoved upon this shaft, substantially as described.

9. An apparatus for the continuous photographing of pages, drawings, and the like, forming parts of a book, comprising, in combination, a photographic camera, a shutter, forming part thereof, means for actuating the shutter, a table adapted to receive the book, another table adapted to carry the cover of the book, horizontal rods attached to the frame of the apparatus, sleeves arranged on said rods and being guided thereat and being connected with said second table, guide rails affixed to the frame of the apparatus and being adapted to guide the table vertically, means to adjust the table along said rails, a suction pipe and suction heads thereat and being adapted to lift the sheets etc. to be photographed, means to produce a sucking current in said suction pipe, a bell-crank lever to which the said pipe is adjustably attached, a cam disk so arranged as to be adapted to actuate said lever, means to operate said disk, and a suction chamber having a perforated front wall against which the sheet etc. is lifted by the said lever and the said suction pipe, as set forth.

10. An apparatus for the continuous photographing of pages, drawings, and the like, forming parts of a book, comprising, in combination, a photographic camera, a shutter forming part thereof, means for actuating the shutter, a table adapted to receive the book, another table adapted to carry the cover of the book, horizontal rods attached to the frame of the apparatus, sleeves arranged on said rods and being guided thereat and being connected with said second table, ledges attached to the lower surface of the two tables and having edges beveled at 45° and engaging each other positively in such a manner that the second table is shifted horizontally when the first is shifted vertically, subtantially as described.

11. An apparatus for the continuous photographing of pages, drawings, and the like, forming parts of a book, comprising, in combination, a photographic camera, a shutter forming part thereof, means for actuating the shutter, a table adapted to receive the book, a suction pipe and suction heads thereat and being adapted to lift the sheets etc. to be photographed, means to produce a sucking current in said suction pipe, a tube shoved upon the lever carrying the said suction pipe, a spring adapted to act on said tube, a pawl adapted to retain said spring, an abutment for releasing said pawl so as to cause the said spring to lift the said tube with the said suction pipe, a lug provided at the tube and being adapted to co-operate with a cam disk, and means to operate said disk, all substantially as described and shown.

In testimony whereof I affix my signature.

MAX BRESLAUER.